(12) United States Patent
Tomblin et al.

(10) Patent No.: US 12,318,916 B2
(45) Date of Patent: Jun. 3, 2025

(54) SURFACE PREPARATION END EFFECTOR FOR INDUSTRIAL ROBOT SYSTEM AND INSPECTION AND REPAIR PROCESSES

(71) Applicant: Wichita State University, Wichita, KS (US)

(72) Inventors: John Tomblin, Wichita, KS (US); Caleb Saathoff, Wichita, KS (US); Upul Palliyaguru, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 281 days.

(21) Appl. No.: 18/049,448

(22) Filed: Oct. 25, 2022

(65) Prior Publication Data

US 2023/0146701 A1 May 11, 2023

Related U.S. Application Data

(60) Provisional application No. 63/271,506, filed on Oct. 25, 2021.

(51) Int. Cl.
  *B25J 15/00* (2006.01)
  *B25J 9/02* (2006.01)
  (Continued)

(52) U.S. Cl.
  CPC .......... *B25J 15/0019* (2013.01); *B25J 9/023* (2013.01); *B25J 9/1684* (2013.01); *B25J 15/0408* (2013.01); *B25J 15/0491* (2013.01)

(58) Field of Classification Search
  CPC ...... B25J 15/0019; B25J 9/023; B25J 9/1684; B25J 15/0408; B25J 15/0491;
  (Continued)

(56) References Cited

U.S. PATENT DOCUMENTS

| | | | | |
|---|---|---|---|---|
| 8,833,169 B2 * | 9/2014 | Lute, Jr. | ............... | G01N 29/225 73/633 |
| 10,596,627 B2 * | 3/2020 | Goehlich | .................. | B64F 5/10 |

(Continued)

OTHER PUBLICATIONS

Li et al., Modular End-Effector System for Autonomous Robotic Maintenance & Repair, May 23-27, 2022, 2022 IEEE International Conference on Robotics and Automation, pp. 4510-4516 (Year: 2022).*

(Continued)

*Primary Examiner* — Sze-Hon Kong
(74) *Attorney, Agent, or Firm* — Stinson LLP

(57) ABSTRACT

A robot end effector for surface preparation in an automated inspection and repair system for composite parts has an end effector body and a plasma control unit and a plasma jet nozzle supported on the end effector body. The plasma control unit directs a jet of atmospheric plasma through the plasma jet nozzle. A slave tool changer is secured to the end effector body. The slave tool changer releasably and operatively connects the robot end effector to an industrial robot such that the industrial robot can move the robot end effector along a composite part as the plasma control unit directs a jet of atmospheric plasma through the plasma jet nozzle toward the composite part to clean the composite part and increase a surface free energy of the composite part.

14 Claims, 14 Drawing Sheets

(51) Int. Cl.
*B25J 9/16* (2006.01)
*B25J 15/04* (2006.01)
(58) Field of Classification Search
CPC ...... B25J 9/1617; B25J 9/1669; B25J 9/1679; B25J 11/00; B29C 2059/145; B29C 59/142; B29C 73/24; G05B 2219/40302; G05B 2219/40613; H05H 2242/00
See application file for complete search history.

(56) References Cited

U.S. PATENT DOCUMENTS

| | | | | |
|---|---|---|---|---|
| 11,809,200 | B1* | 11/2023 | Dickens | B25J 9/1635 |
| 12,097,528 | B2* | 9/2024 | Hemes | B24B 51/00 |
| 2009/0249606 | A1* | 10/2009 | Diez | B25J 15/0608 |
| | | | | 29/428 |
| 2010/0140969 | A1* | 6/2010 | Lin | B25J 15/0052 |
| | | | | 294/86.4 |
| 2011/0043515 | A1* | 2/2011 | Stathis | G05D 1/027 |
| | | | | 434/118 |
| 2011/0210110 | A1* | 9/2011 | Dearman | B23K 37/0282 |
| | | | | 219/136 |
| 2012/0152877 | A1* | 6/2012 | Tadayon | F24S 40/90 |
| | | | | 901/30 |
| 2012/0328395 | A1* | 12/2012 | Jacobsen | B66F 9/18 |
| | | | | 414/1 |
| 2015/0140230 | A1* | 5/2015 | Jones | B22F 12/44 |
| | | | | 427/457 |
| 2018/0129187 | A1* | 5/2018 | Spieker | G05B 19/4097 |
| 2019/0337255 | A1* | 11/2019 | Tarasconi | B30B 15/028 |
| 2020/0238414 | A1* | 7/2020 | Gu | B23K 9/32 |
| 2020/0269439 | A1* | 8/2020 | Telleria | B25J 11/005 |
| 2020/0298403 | A1* | 9/2020 | Nilsson | B23Q 3/15713 |
| 2021/0154859 | A1* | 5/2021 | Iijima | B25J 13/085 |
| 2021/0276203 | A1* | 9/2021 | Carithers | B25J 15/0441 |
| 2021/0302391 | A1* | 9/2021 | Franzen | G01N 29/30 |
| 2021/0302937 | A1* | 9/2021 | Ridgeway | G05B 19/4099 |
| 2021/0323167 | A1* | 10/2021 | Hemes | B25J 9/163 |
| 2022/0134691 | A1* | 5/2022 | Ridgeway | G06F 30/20 |
| | | | | 156/1 |
| 2022/0142422 | A1* | 5/2022 | Giarritta | A47L 11/4025 |
| 2022/0212341 | A1* | 7/2022 | Mehr | B25J 9/1664 |
| 2022/0362931 | A1* | 11/2022 | Wheaton | B25J 9/1653 |
| 2022/0395947 | A1* | 12/2022 | Pickering | B23Q 3/15713 |
| 2023/0010426 | A1* | 1/2023 | Coyne | B25J 9/161 |
| 2023/0211558 | A1* | 7/2023 | Sherehiy | B29C 64/25 |
| | | | | 414/749.1 |
| 2024/0018942 | A1* | 1/2024 | Sadeghian | F03D 17/004 |
| 2024/0049958 | A1* | 2/2024 | Sagiv | H05H 1/2406 |
| 2024/0070910 | A1* | 2/2024 | Yoshida | G06T 7/11 |

OTHER PUBLICATIONS

ATI Industrial Automation, Tool Changer Models, https://web.archive.org/web/20201130040749/https:/www.ati-ia.com/Products/toolchanger/QC.aspx?ID-QC-210, Nov. 2020, 2 pages.

Plasmatreat, Openair-Plasma® Technology, https://web.archive.org/web/20210119185740/https:/www.plasmatreat.com/plasma-technology/openair-atmospheric-plasma-technique.html, Jan. 2021, 9 pages.

Plasmatreat, Openair-Plasma® Systems, Robot Systems, https://web.archive,org/web/20210301000756/https:/www.plasmatreat.com/openair-plasma-systems/plasma-treatment-robot-systems.html, Mar. 2021, 5 pages.

Plasmatreat, Plasma System Components, Plasma Nozzles, https://web.archive.org/web/20210123085836/https:/www.plasmatreat.com/plasma-system-components/plasma-nozzles_for_cold-plasma-generation.html, Jan. 2021, 9 pages.

Plasmatreat, Plasma System Components, Plasma Generators, https://web.archive.org/web/20210625125033/https:/www.plasmatreat.com/plasma-system-components/plasma-generators.html, Jun. 2021, 14 pages.

ATI Industrial Automation, TSL Configuration Examples, https://web.archive.org/web/20180607061549/http:/www.ati-ia.com/products/toolchanger/toolstand/large/TSL_ConfigExamples.aspx, Jun. 2018, 2 pages.

* cited by examiner

SURFACE PREPARATION END EFFECTOR FOR INDUSTRIAL ROBOT SYSTEM AND INSPECTION AND REPAIR PROCESSES

CROSS-REFERENCE TO RELATED APPLICATION

This application claims priority to U.S. Provisional Patent Application No. 63/271,506, filed Oct. 25, 2021, which is hereby incorporated by reference in its entirety.

FIELD

This disclosure generally pertains to a robot end effector for surface preparation in an automated inspection and repair system for composite parts and methods and industrial robot systems employing the end effector in question.

BACKGROUND

There is a need for improved repair systems for composite parts. In particular, there is a need for tools that can automate the repair of composite parts placed into service. Many of the tools that are used to inspect, repair, and verify composite part repairs are non-automated.

SUMMARY

In one aspect, a robot end effector for surface preparation in an automated inspection and repair system for composite parts comprises an end effector body. A plasma control unit and a plasma jet nozzle are supported on the end effector body. The plasma control unit is configured for directing a jet of atmospheric plasma through the plasma jet nozzle. A slave tool changer is secured to the end effector body. The slave tool changer is configured to releasably and operatively connect the robot end effector to an industrial robot such that the industrial robot can move the robot end effector along a composite part as the plasma control unit directs a jet of atmospheric plasma through the plasma jet nozzle toward the composite part to clean the composite part and increase a surface free energy of the composite part.

In another aspect, a method of repairing a composite part comprises connecting an industrial robot to an inspection end effector and inspecting the composite part. Subsequently, the inspection end effector is disconnected from the industrial robot and an atmospheric plasma surface preparation end effector is connected to the industrial robot via a slave tool changer of the end effector. Subsequently, the atmospheric plasma surface preparation end effector is used to treat a surface the composite part. Subsequently, a repair patch is adhered to the treated surface.

In another aspect, an industrial robot system comprises an industrial robot. An atmospheric plasma surface preparation end effector is releasably connected to the industrial robot such that the industrial robot can interchangeably connect to the atmospheric plasma surface preparation end effector and at least one other type of end effector for performing a different inspection or repair process. A control system is configured to control both the industrial robot and the atmospheric plasma surface preparation end effector to coordinate movement of the industrial robot and the atmospheric plasma system to treat a predefined surface region of the composite part with atmospheric plasma to increase a surface free energy of the predefined region surface region.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

The present disclosure generally pertains to a system for automating certain aspects of inspection and repair of composite parts. Additional information about such a system is provided in U.S. patent application Ser. No. 17/828,558, filed May 31, 2022, and assigned to the same assignees as the present disclosure, which is hereby incorporated by reference in its entirety. As described in U.S. patent application Ser. No. 17/828,558, an exemplary embodiment of the system is implemented to inspect and repair composite rotorcraft blades to aid in sustainment programs that ensure airworthiness. However, it will be understood that the principles of the system can be adapted for use with various other composite parts. Further, although the system described below is used in a sustainment program, it is contemplated that the inspection and repair system might also have other applications, e.g., quality control during initial manufacture.

Figure 1:
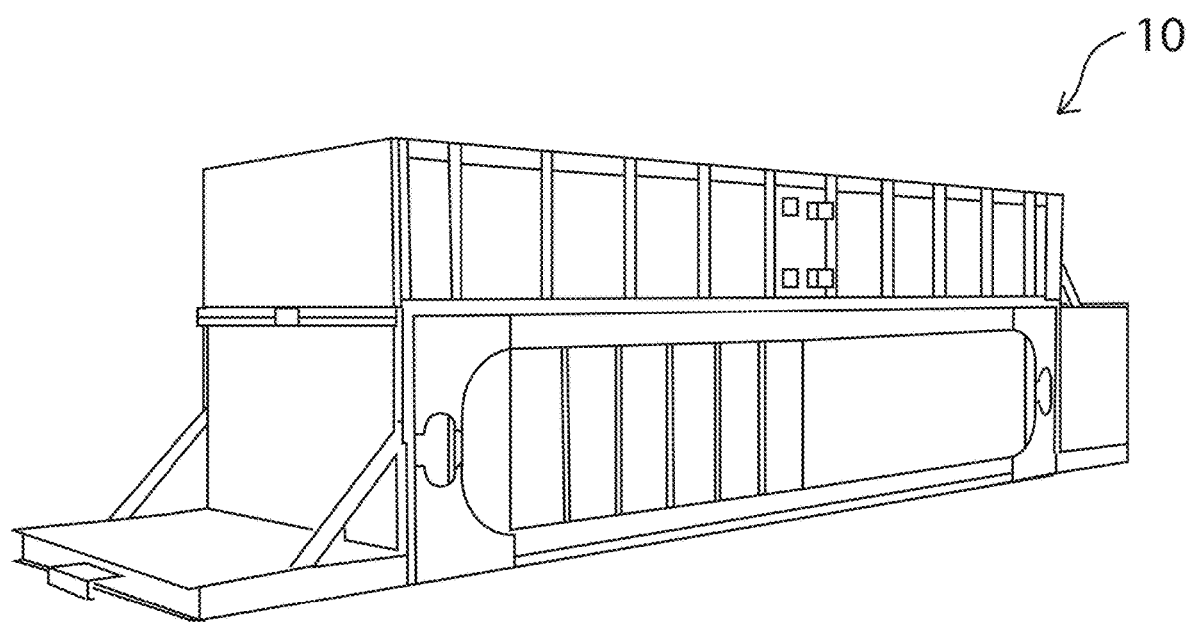
FIG. 1 is a perspective of a joint autonomous repair verification an inspection system (hereinafter, JARVIS) cell in a deployed configuration.
Figure 2:
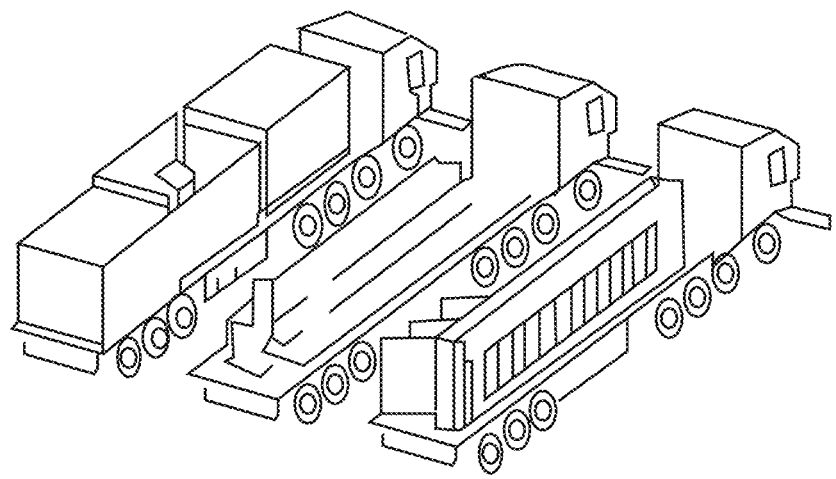
FIG. 2 is a perspective of the JARVIS cell in a transport configuration.
Figure 3:
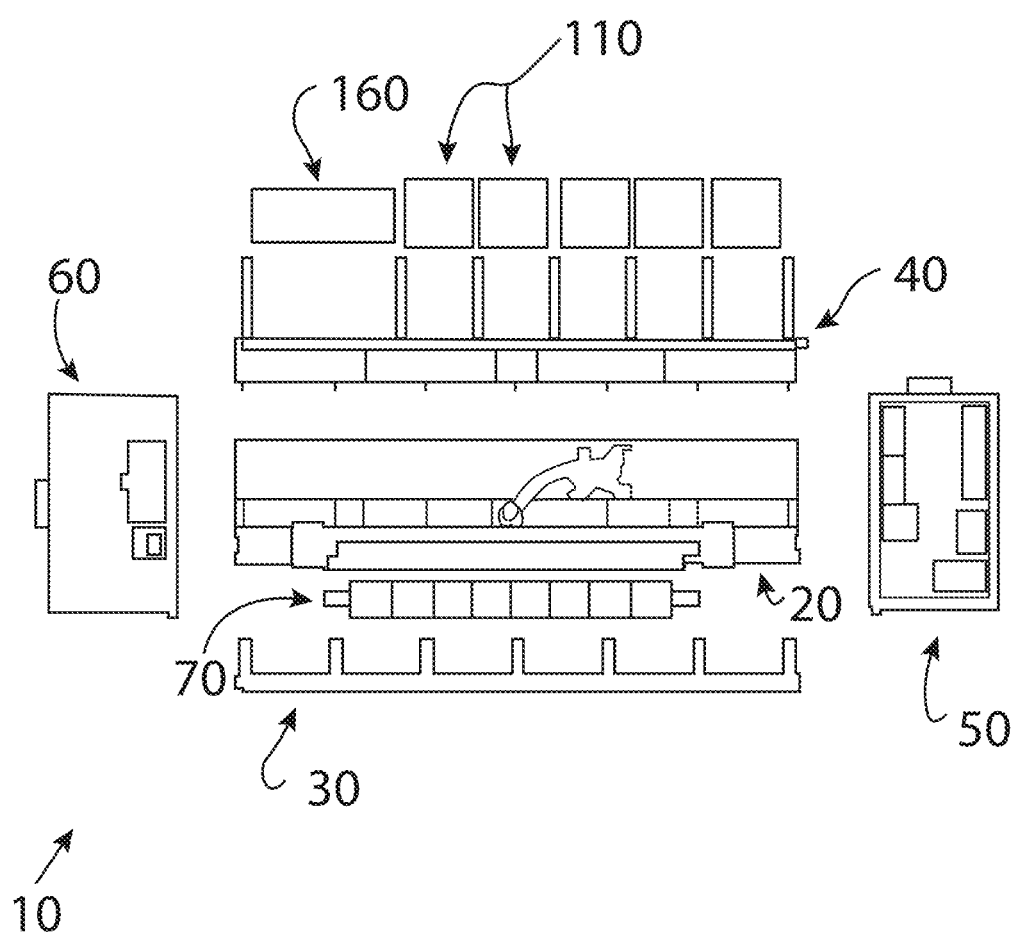
FIG. 3 is an exploded plan view of the JARVIS cell.
Figure 4:
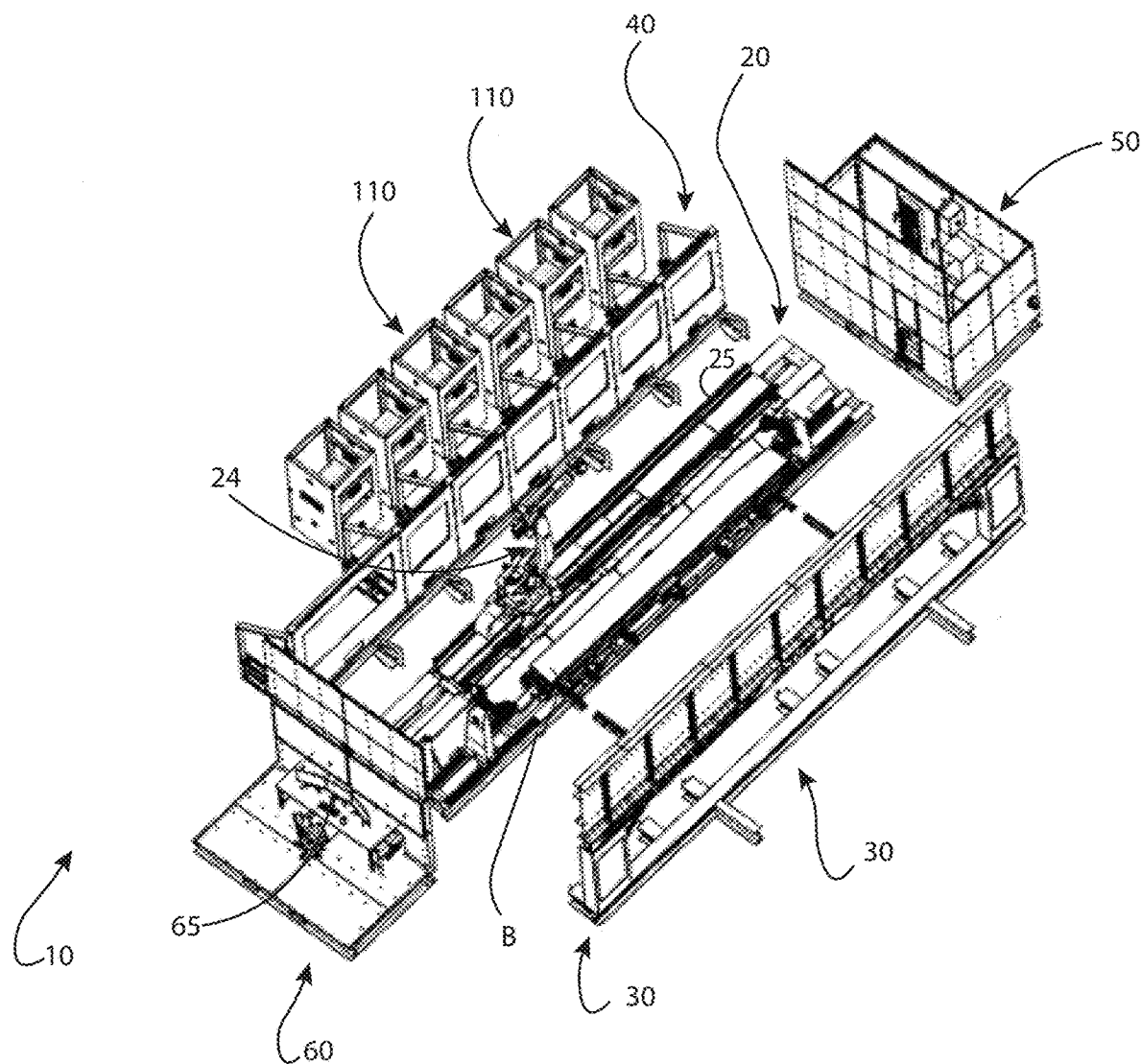
FIG. 4 is an exploded perspective of the JARVIS cell.

Referring to FIGS. 1-4, an exemplary embodiment of a joint autonomous repair verification an inspection system (hereinafter, JARVIS) cell is generally indicated at reference number 10. FIG. 1 shows the JARVIS cell 10 deployed on site, and FIG. 2 shows the JARVIS cell broken down onto three flatbed trailers for transport. Design elements for the illustrated JARVIS cell are based on intended platform size and features (e.g., the size of the cell is driven by the application-specific needs of inspecting large main rotorcraft blades). It will be understood that other embodiments can be sized appropriately for other applications.

In general, the JARVIS cell 10 comprises a blade processing station 20 (hereinafter, BPS) (broadly, a 'part processing station'), a blade induction station 30 (hereinafter, BIS) (broadly, a 'part induction station'), a tool docking station 40 (hereinafter, TDS), an equipment supply station 50 (hereinafter, ESS), a control station 60 (hereinafter, JCS), a support cart 70 (hereinafter, BSC), a set of modular tool cartridges 110, and a patch machining cartridge 160 (hereinafter, PMC). All stations can be manufactured, stored, and shipped independently to adhere to shipping size constraints. As shown in FIG. 2, in one or more embodiments, the total truck requirement for shipment is three flatbed trucks. With this configuration, MTCs 110, PMC 160, JCS 60 and ESS 50 will be transported on truck one. Truck two will transport the BPS 20 and industrial robot that has been removed from the BPS track system. Truck three transports the BIS 30 and TDS 40. All delicate instruments can be removed from the MTCs 110 and other cell locations to ensure no damage occurs during transit.

The illustrated BPS 20 broadly comprises a robot and track assembly 21 (broadly, a robot) configured to reach the full length and width of the part. In the illustrated embodiment, the robot 24 comprises a KUKA KR210 R3100 robot and the track system 25 comprises a KUKA KL4000 track system, but it will be understood that other industrial robots and track systems could also be used without departing from the scope of the disclosure. Furthermore, in certain embodiments, the BPS robot could comprise an industrial robot arm with no track system, a gantry system with no robot arm, etc., depending on the requirements of the application. The robot 24 is configured to perform all actions in the JARVIS cell 10. In the illustrated embodiment, the robot 24 is equipped with a master tool changer 26 that is configured to interchangeably connect to a plurality of different slave tool changes associated with a plurality of different robot end effectors used for different processes in the JARVIS cell.

Figure 5:
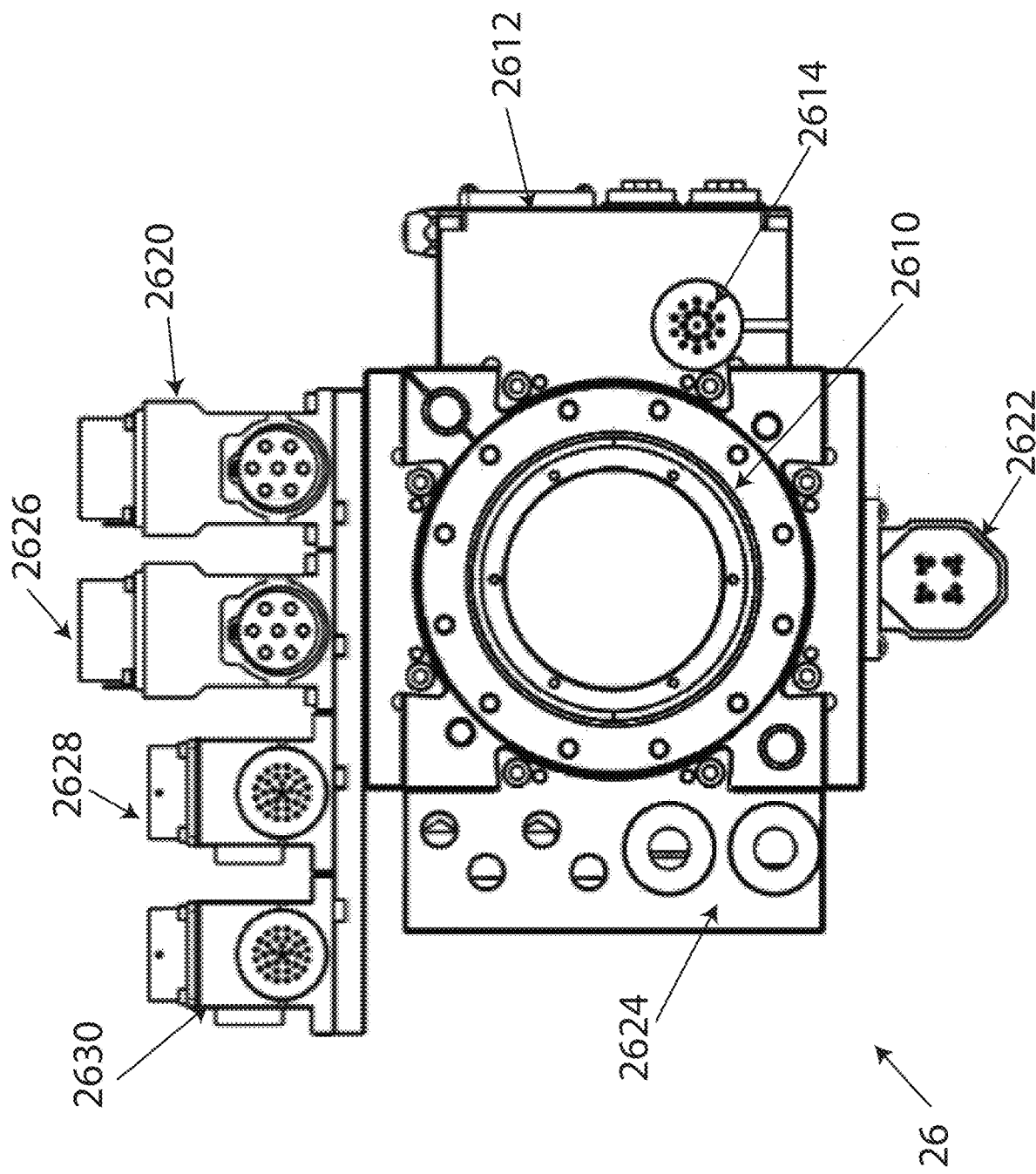
FIG. 5 is an elevation of a master tool changer of the JARVIS cell.

Referring to FIG. 5, in an exemplary embodiment, the master tool changer 26 is a custom-configured ATI quick change robotic tool changer with a plurality of connectors for interchangeably connecting the robot 24 to a plurality of different types of robot end effectors with different requirements. The master tool changer 26 comprises a mounting interface 2610 configured for interchangeably coupling to the slave tool changers of the various robot end effectors used in the JARVIS cell, whereby the master tool changer 25 mounts individual end effectors on the robot. The mounting interface 2610 comprises a pneumatic locking actuator 2612 configured to selectively lock with each slave tool changer to secure the respective end effector in place with respect to the master tool changer so that the end effector moves with the robot in relation to the composite part. As understood by those skilled in the art, the locking actuator 2612 comprises a signal connector 2614 that couples to a mating signal connector on each slave tool changer before the locking actuator actuates the locking mechanism. When the connector 2614 is mated to a mating connector of the slave tool changer, there is an exchange of signals between the master tool changer 26 and the slave tool changer by which the master tool changer determines (i) that it has been properly aligned with the slave tool changer for locking and (ii) which type of end effector it has been connected to.

In the JARVIS cell 10, the master tool changer 26 is capable of connecting the robot 24 to many different types of robot end effectors with different input/output requirements. To accommodate all of the input/output requirements, the master tool changer 26 is equipped with a standard power connector 2620, an Ethernet connector 2622, a pneumatic connector 2624, two special-purpose plasma generator connectors 2626, 2628, and a pulsed thermography connector 2630. As explained in U.S. patent application Ser. No. 17/828,558, the JARVIS cell 10 can be configured to run entirely from one 480-V connection to main power and one connection to a 120-psi compressed air source. The power connector 2620 is configured to convey power (e.g., 120-V power) from the main power source to a robot end effector. The pneumatic connector 2624 is likewise configured to convey compressed air from the compressed air source to a robot end effector. The Ethernet connector 2622 is configured pass signals between the JARVIS cell control system and the robot end effector. The thermography connector 2630 is configured to make a connection specific to a thermography end effector, and the plasma generator connectors 2626, 2628 are configured to make high voltage connections for conducting atmospheric plasma surface preparation treatment from a robot end effector.

Referring again to FIGS. 1-4, the support cart 70 is configured to support the part in the JARVIS cell 10 and facilitate transport of the part into and out of the cell. The part and the support cart 70 move into and out of the JARVIS cell through the BIS 30. And BIS 30 is configured to selectively close the JARVIS cell 10 to meet the required safety specifications of the inspection and repair operations taking place therein. The TDS 40 defines a plurality of tool docks 41 with which the modular tool cartridges 110 are configured to connect. Each modular tool cartridge 110 contains a robot end effector that can attach to the end of the robot 21 for performing an inspection or repair operation.

The modular tool cartridges 110 include robotic end effectors for non-destructive testing, such as a camera, a laser three-dimensional scanner, a pulsed thermography end effector, and a shearography end effector, as well as a milling end effector, an atmospheric plasma generator (broadly, a surface preparation end effector), a composite surface preparation verification system, and a laser ablation end effector. Below this disclosure focuses on an atmospheric plasma surface treatment end effector and its integration with the JARVIS cell and use in the JARVIS cell processes.

The power and compressed air connections are made at the ESS 50, and the human operator is stationed within the control station 60 to operate/monitor the JARVIS cell 10. Through a series of automated and/or user-controlled operations, the JARVIS cell 10 is configured to inspect and then facilitate the repair of the composite part. The JARVIS cell 10 operates in combination with a database that stores unique records of the inspection data and repairs for every composite part that is addressed by the cell.

Exemplary embodiments of certain processes that can be performed using the JARVIS cell 10 will now be briefly described. In general, the JARVIS cell 10 is configured for use in verifying and inspecting repaired composite parts such as rotorcraft blades to ensure that the part is repaired to meet required specifications. As explained more fully below, the JARVIS cell 10 can also be used to perform certain processes involved in making the necessary repairs to a composite part. The inspection methods employed using the JARVIS cell 10 can generate a robust data set with information about the composite part and repairs thereto. In addition to using these data for repair verification and making further repairs to the composite part, these data can be used outside of the cell processes in downstream continuous improvement processes.

Broadly speaking, this disclosure expressly contemplates 15 different cell processes, which will be described in detail below: (1) Blade Identification; (2) Blade Loading; (3)

Virtual Scanning; (4) Digital Imaging; (5) Laser Shearography; (6) Pulsed Thermography; (7) Static Balance; (8) Core Ply and Repair Patch Design Selection; (9) Paint Removal; (10) Damage Removal; (11) Core Restoration; (12) Core Shaping; (13) Surface Preparation and Bond Readiness Testing; (14) Repair Patch Machining; and (15) Adhesive Application. This disclosure focuses on use of the cell with rotorcraft blades, but it will be understood that the same processes can be adapted for other types of composite parts.

In an exemplary process, a composite part is introduced into the cell through the BIS 30. Initially, the blade is identified for purposes of maintaining the database. If the part has previously been subject to inspection or repair by the cell, an identifier for the cell can be determined by a barcode scan, text recognition, or manual entry of a known identifier for the part. Otherwise, a new database record for the part is created with a new unique identifier.

An inspection system of the cell 10 subsequently conducts a detailed nondestructive inspection of the blade. In an exemplary embodiment, the inspection includes conducting a three-dimensional laser scan of the part from which a detailed three-dimensional model of a portion of or the entirety of the part can be created. Scanning provides a foundation for all other data to be displayed and for orienting the robot in relation to the part for performing subsequent inspection and repair processes. All NDI data uses the surface model generated in the virtual scanning step to provide the end user with the ability to visualize indications of damage. Virtual scan data is also utilized in the generation of tool paths for processing and provides high-fidelity geometrical details for quality control of repair machining operations. As known to those skilled in the art, the industrial robot is controlled by reference to a robot positioning coordinate system. The JARVIS software is configured to map the three-dimensional model of the composite part to robot positioning coordinates so that subsequent robot processes are precisely coordinated to the composite part.

The inspection can further comprise taking a series of photographs of the part from one or more (e.g., all angles), conducting a pulsed thermography scan of the part, and conducting a shearography scan of the part. In one or more embodiments, a plurality of the above-described inspection steps are conducted by the robot 24. For instance, the robot can attach to a laser scanner end effector stored in one of the MTCs 110 and then perform a laser scan to obtain the three-dimensional model of the part. Subsequently, the robot can release the laser scanner into its MTC 110 and attach to a digital camera end effector stored in another MTC 110 and then take the required images of the part. The robot 24 can then release the camera end effector into its MTC 110 and attach consecutively to a shearography end effector and pulsed thermography end effector in their respective MTCs 110 to conduct shearography and pulsed thermography scanning. It will be apparent that other NDI end effectors can be used from other MTCs 110 if desired.

Upon completion of the non-destructive testing, a damage assessment system of the cell 110 is configured to create a digital twin of the part and store the digital twin in the inspection and repair database. The digital twin comprises the three-dimensional model of the part and each of the other types of non-destructive testing data wrapped onto the three-dimensional model. In an exemplary embodiment, the system uses an image stitching process to stitch together a set of overlapping NDI images of one or more types of NDI data to form a composite image that is wrapped onto the three-dimensional model. For instance, one embodiment of the cell creates a stitched composite photographic image of the part, a stitched composite shearography image of the part, and/or a stitched composite pulsed thermography image of the part that are wrapped onto the three-dimensional model.

The digital twin is stored in the inspection and repair database for future reference and is also used to assess the part for damage. In an exemplary embodiment, the damage assessment system may automate the damage assessment process by training a convolutional neural network to identify locations of damage in the NDI images. After the damage is assessed, either by a user or a machine learning image analysis model, the cell 10 can be used to repair the composite part.

In an exemplary embodiment, a repair system of the cell 10 facilitates composite scarf joint repair and core repair. For each type of repair, paint is first removed from the repair area. In an exemplary embodiment, the robot 24 attaches to a color-selective laser ablation tool to perform the paint removal. The laser ablation end effector may suitably be held in a modular tool cartridge 110 or be an internal component of the cell. In certain embodiments, the cell 10 includes a laser projection system that is configured to project an image onto the area where a repair is to be conducted. After removing paint from the area in question, skin and/or core material is removed from the part. Suitably, the robot 24 attaches to a milling end effector (which may be held in a modular tool cartridge or maintained as a separate part) and uses the milling tool to automatically remove the damaged material based on coordinates generated from the nondestructive testing data.

The cell 10 can conduct a scarf repair of damaged skin of the composite part. Before machining the scarf repair patch, the cell 10 scans the area that has been prepared for repair. Based on the scan data, the system automatically generates a shape file for the scarf repair patch. A precured laminate is loaded onto a Patch Machining Cartridge 160 (PMC) of the cell 10. The robot 24 uses the milling end effector to cut the precured laminate to the determined size and shape for the scarf repair patch on the PMC 160.

In an exemplary embodiment, the robot attaches to an atmospheric plasma generator and uses the atmospheric plasma generator to prepare the surface for bonding by increasing the surface energy of the bonding surfaces. This disclosure pertains particularly certain exemplary embodiments of an atmospheric plasma generator system that are usable with the JARVIS cell 10.

The cell can project an image onto the surface of the composite part indicating where adhesive should be applied. A user can manually position a structural adhesive film and then position the machined scarf repair patch onto the adhesive.

For a core repair, following scarf machining and after the core material is removed, a core plug formed from the same material is machined to fit tightly into the pocket formed by removal of the damaged core section. The core plug can be formed outside of the cell in an appropriate process. Before placing the core plug into the part, the surfaces of the composite part are preferably prepared for bonding. Again, the robot 24 uses the atmospheric plasma generator to prepare the surface for adhesion. The core plug is then adhered in the desired location before the robot 24 again uses the milling end effector to shape the core plug in-place to match the contour of the part. In an exemplary embodiment, the cell 10 uses a laser projection system to project an image onto the composite part indicating the location where adhesive should be applied. Suitably, an adhesive film can be manually applied to the indicated location before placing the plug and subsequently machining the core repair to the desired contour.

When repair is complete, another inspection of the composite part can be conducted to create and store a detailed record (e.g., digital twin) of the repair. The repair records stored in the database are believed to provide utility in long-term sustainment operations. For example, a technician can evaluate the past inspection and repair records for a composite part to make a more informed assessment of whether the composite part can withstand another required repair or update.

The JARVIS cell employs a software framework that is broadly configured to (1) control the automated processes discussed above, (2) visualize the composite part and NDI data, (3) manage the JARVIS database, and (4) execute machine learning algorithms based on the NDI data and database content. The JARVIS software framework comprises a set of connected software modules executed by a processor of the JARVIS workstation 65. It will be understood that software modules comprise computer executable code stored in processor-readable memory and that one or more processors at the same or remote locations can be used to execute the code to carry out the software module's function. In an exemplary embodiment, the JARVIS cell 10 employs any combination of the following software modules: a communication module, a visualization module, an image stitching module, a database, a feature detection module (broadly, a damage assessment module), a toolpath generation module, and one or more NDI modules, such as a digital imaging module, a virtual scanning module, a thermography module, and a shearography module.

Figure 6:
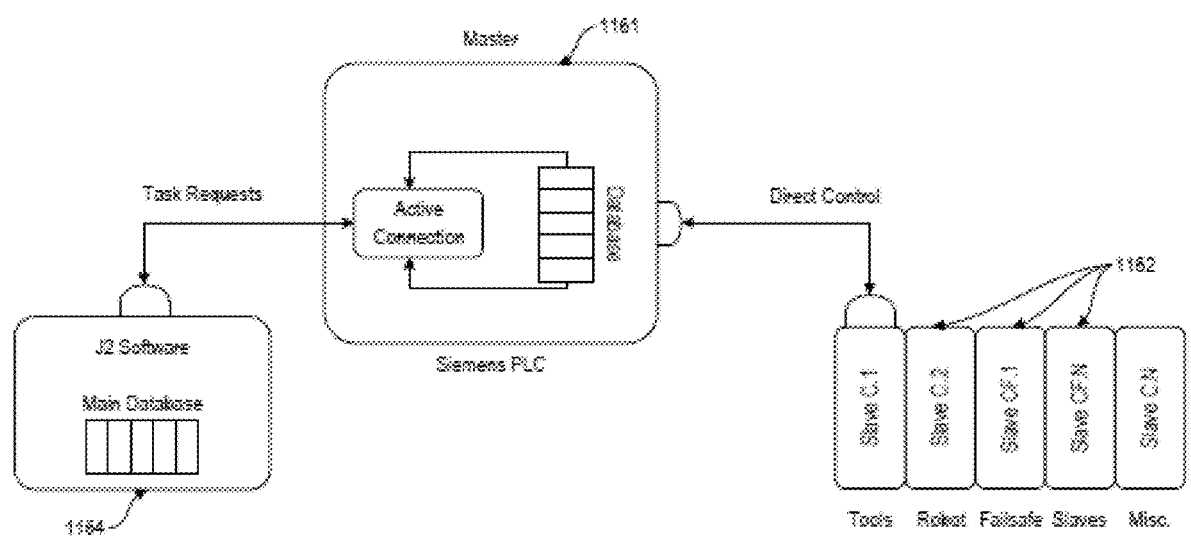
FIG. 6 is a schematic block diagram of a control system of the JARVIS cell.

Referring to FIG. 6, the JARVIS cell 10 fundamentally employs a master-slave control system 1160 comprising a main cell PLC 1161 and a plurality of slave controllers 1162 for various components of the cell. The JARVIS software framework 1164 is the front-end operation through which the operator interfaces with the system 1160 via a user interface device such as the workstation 65. The JARVIS software framework 1164 acts as an intermediary for the PLC 1161, which is used as the master, and the robot or tools, which are slaves 1162 to the PLC. Therefore, the software framework 1164 will not give commands directly to the tools or robot. With the software framework 1164 being a large collection of software modules, significant error could occur. Thus, allowing the PLC 1161 to handle routine operations for automation mitigates chances for error.

Figure 7:
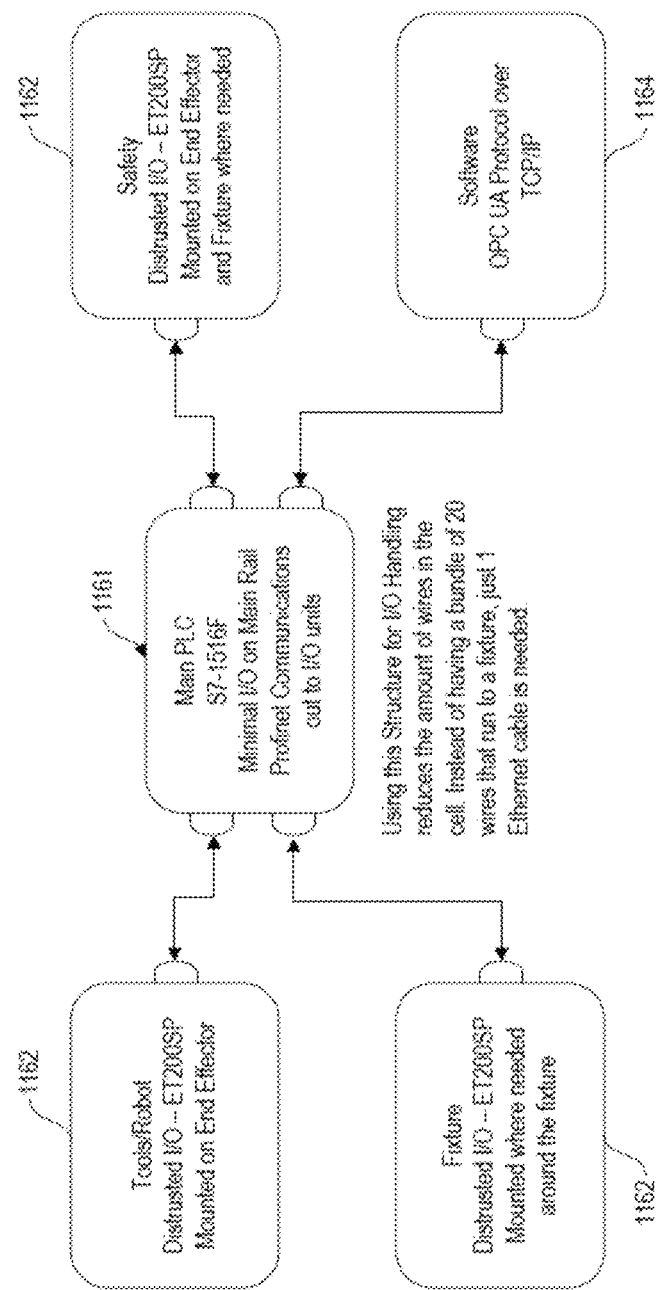
FIG. 7 is another schematic block diagram of a control system of the JARVIS cell.

In one or more embodiments, the JARVIS software framework 1164 establishes a connection directly to the PLC 1161 through an Ethernet/IP connection. The master PLC 1161 contains a local database on-board that allows it to hold and handle volatile data from the tools and robot. Any data being passed from the tools or robot 24 is transmitted through the PLC 1161 and sent directly to the software 1164. This is unless there is an alternate connection method to one of the slave units that allows data transmission directly to the software. These alternate connections are typically also Ethernet/IP connections. Ethernet/IP is the preferred connection method due to its excellent data throughput. Additionally, it allows multiple slave units over a singular connection. An overview of the connections for input/output handling are shown in FIG. 7.

The inputs and outputs of the master-slave allow the main PLC 1161 to handle most of the I/O without the software 1164 needing to poll the slave systems 1162 continuously for updated values. In one or more embodiments, the software 1164 connects to the main PLC 1161 via Open Platform Communications (OPC) using Ethernet/IP. The slave systems 1162 are typically connected via Profibus for core systems and Profisafe for safety systems.

Figure 8:
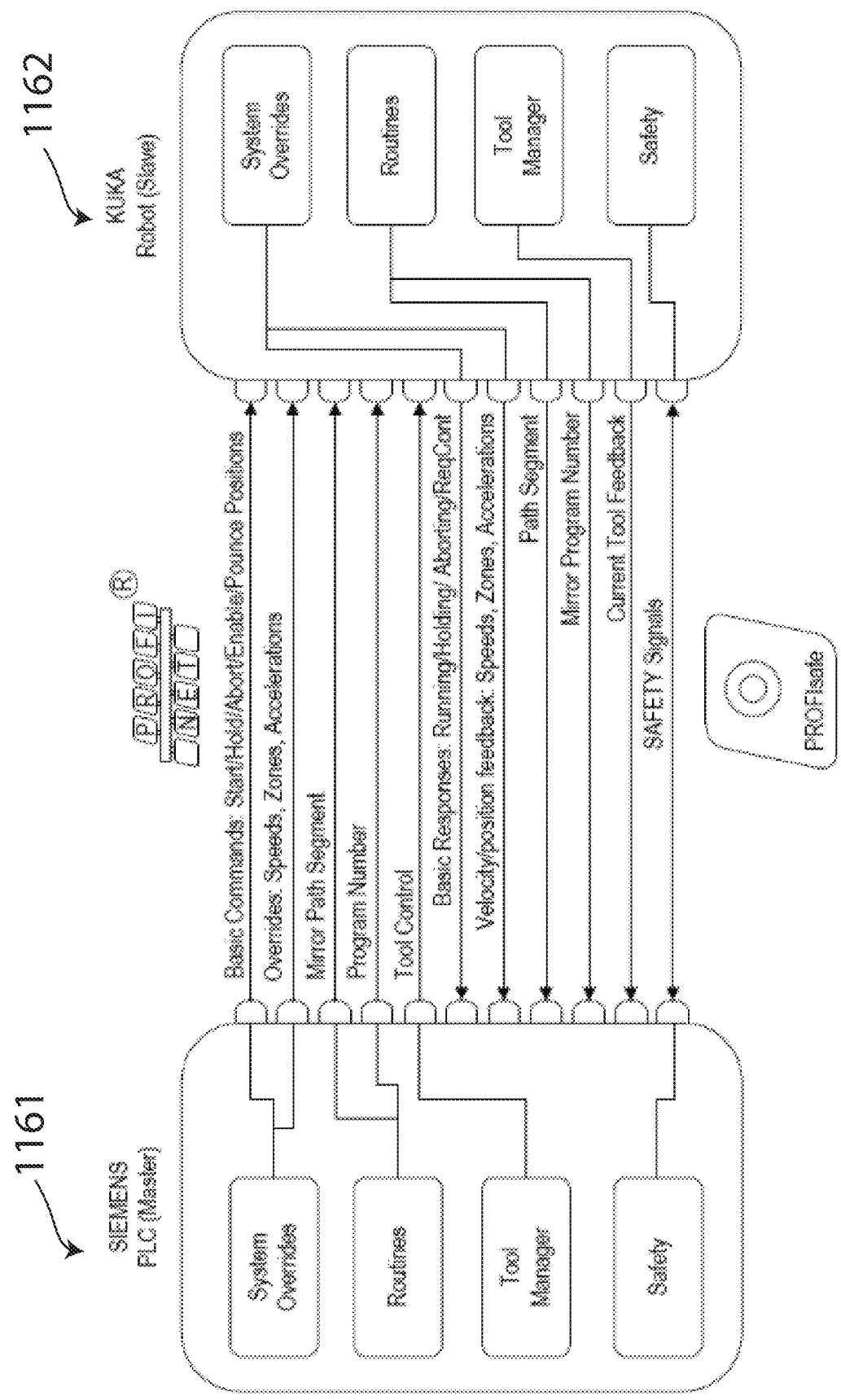
FIG. 8 is a schematic block diagram of a control subsystem of the JARVIS cell including a master PLC and a slave robot controller.

Referring to FIG. 8, the illustrated embodiment uses the Profinet protocol to handle the communication between the master and slave units 1161, 1162. Profinet is an industry technical standard that is used for communication between many factory and automation devices. Profinet establishes connection between the master and slave units 1161, 1162 using an Ethernet/IP connection for fast and reliable data transmission. The Profinet structure mimics the master-slave configuration by having an IO-Controller for the master 1161 and IO-Devices for the slaves 1162. Basic system commands like robotic movements such as start, hold, pounce, etc. are typically transmitted through the Profibus protocol. Profibus also handles the PLC routines such as program number selection, and mirroring path segments.

Figure 9:
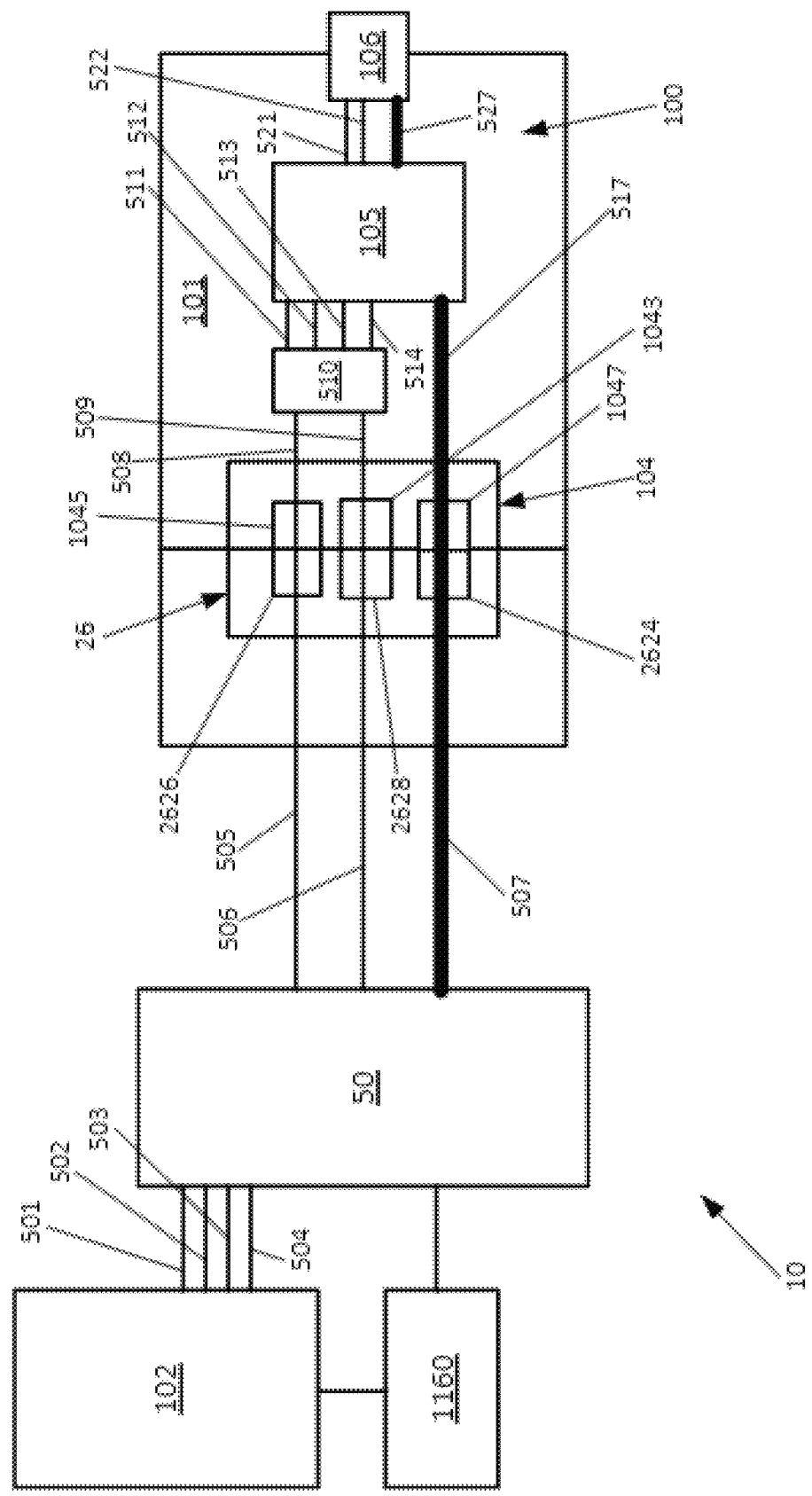
FIG. 9 is a schematic block diagram of the JARVIS cell operatively connected to an atmospheric plasma system thereof.

Referring to FIG. 9, an exemplary embodiment of the JARVIS cell 10 in a configuration for conducting atmospheric plasma surface treatment processes is shown schematically. In this configuration, the JARVIS cell 10 broadly comprises a robotic atmospheric plasma system 100 including an atmospheric plasma end effector 101 and a plasma generator 102. In the illustrated embodiment, the robotic atmospheric plasma system 100 is a modified version of a Plasmatreat Openair-Plasma® system adapted for use on an industrial robot 24, interchangeably with other types of robotic tools. The illustrated plasma generator 102 is a fixture of the JARVIS cell that four outputs to the ESS 50. The outputs include a plasma jet rotation output 501, a voltage-to-transformer output 502, a plasma control unit control signal output 503, and a CAN bus output 504. The ESS 50 combines the four outputs from the plasma generator 102 onto two electrical cables 505, 506 that extend to the plasma generator connectors 2626, 2628 of the master tool changer 26. In addition, the ESS 50 feeds compressed air along a compressed air line 507 to the pneumatic connector 2624 of the master tool changer 26. As explained more fully below, the master tool changer 26 operatively connects the ESS outputs 505, 506, 507 to the atmospheric plasma end effector 101. The two electrical outputs 505, 506 are fed via electrical cables 508, 509 to a junction box 510, where the plasma jet rotation output, a primary-voltage-to-transformer outputs, a plasma control unit control signal output, and a CAN bus output from the plasma generator 102 are broken out onto respective control unit input lines 511, 512, 513, 514, 515 to a plasma control unit 105. A compressed air input line 517 also feeds compressed air from the ESS 50 into the plasma control unit. Based on the electrical and pneumatic inputs 511, 512, 513, 514, 515, 517, the plasma control unit 105 provides outputs for motor control 521, plasma generation voltage 522, and compressed air 527 to a plasma nozzle 106 of the end effector 101, causing the plasma nozzle to output a rotating beam of atmospheric plasma.

Figure 10:
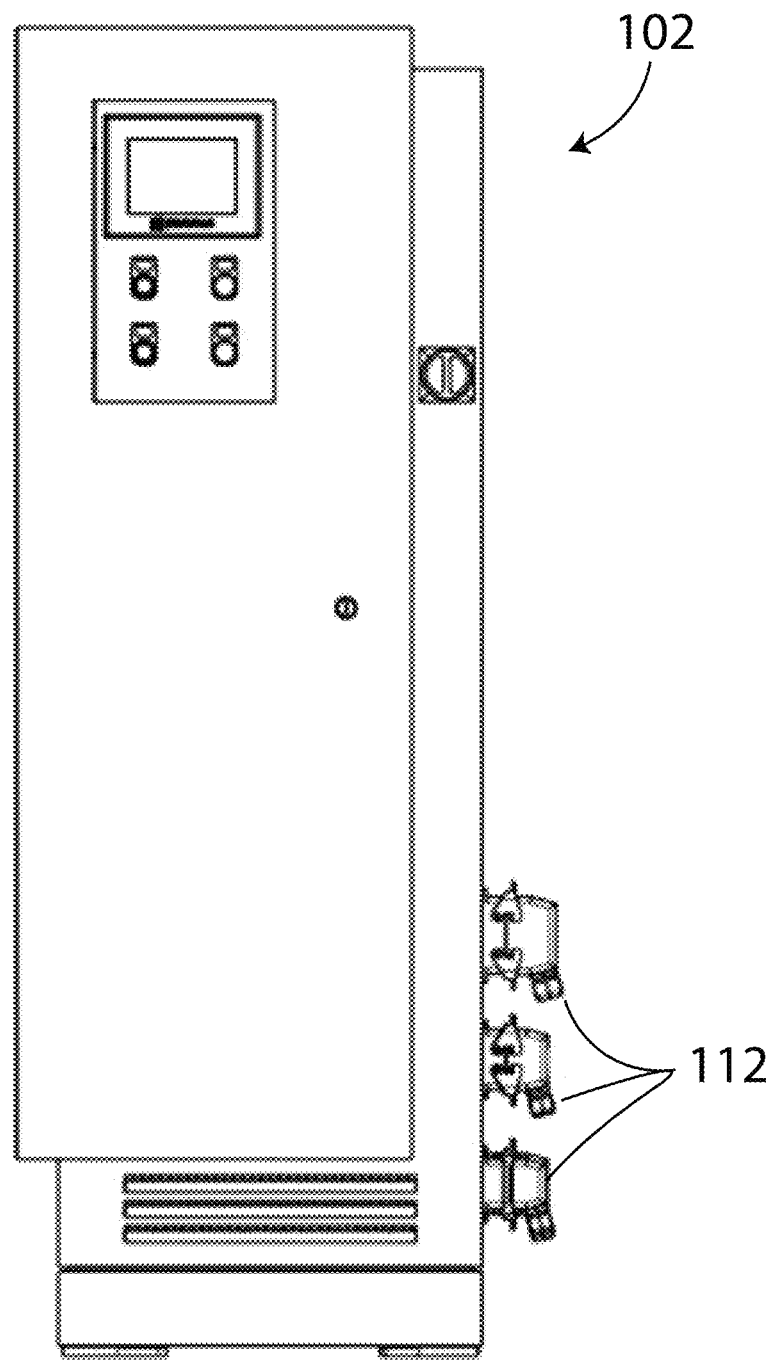
FIG. 10 is an elevation of a plasma generator of the atmospheric plasma system.

Referring to FIG. 10, a suitable plasma generator 102 is a Plasmatreat FG5002 plasma generator. In general, the plasma generator 102 is configured to connect to the main power source for the JARVIS cell 10 and generate an electrical output for producing atmospheric plasma. The plasma generator 102 comprises a plurality of outputs 1021 that are configured to output electrical power and control signals to the end effector 101. These outputs 1021 are the same outputs used in the conventional Plasmatreat Openair-Plasma® system, but the inventors have reconfigured the conventional cabling to connect to the plasma connectors 2626, 2628 of the master tool changer 26, instead of directly to a plasma control unit of a Plasmatreat Openair-Plasma® system. This allows the end effector 101 to freely disconnect from the plasma generator 102 when not in use.

Figure 11:
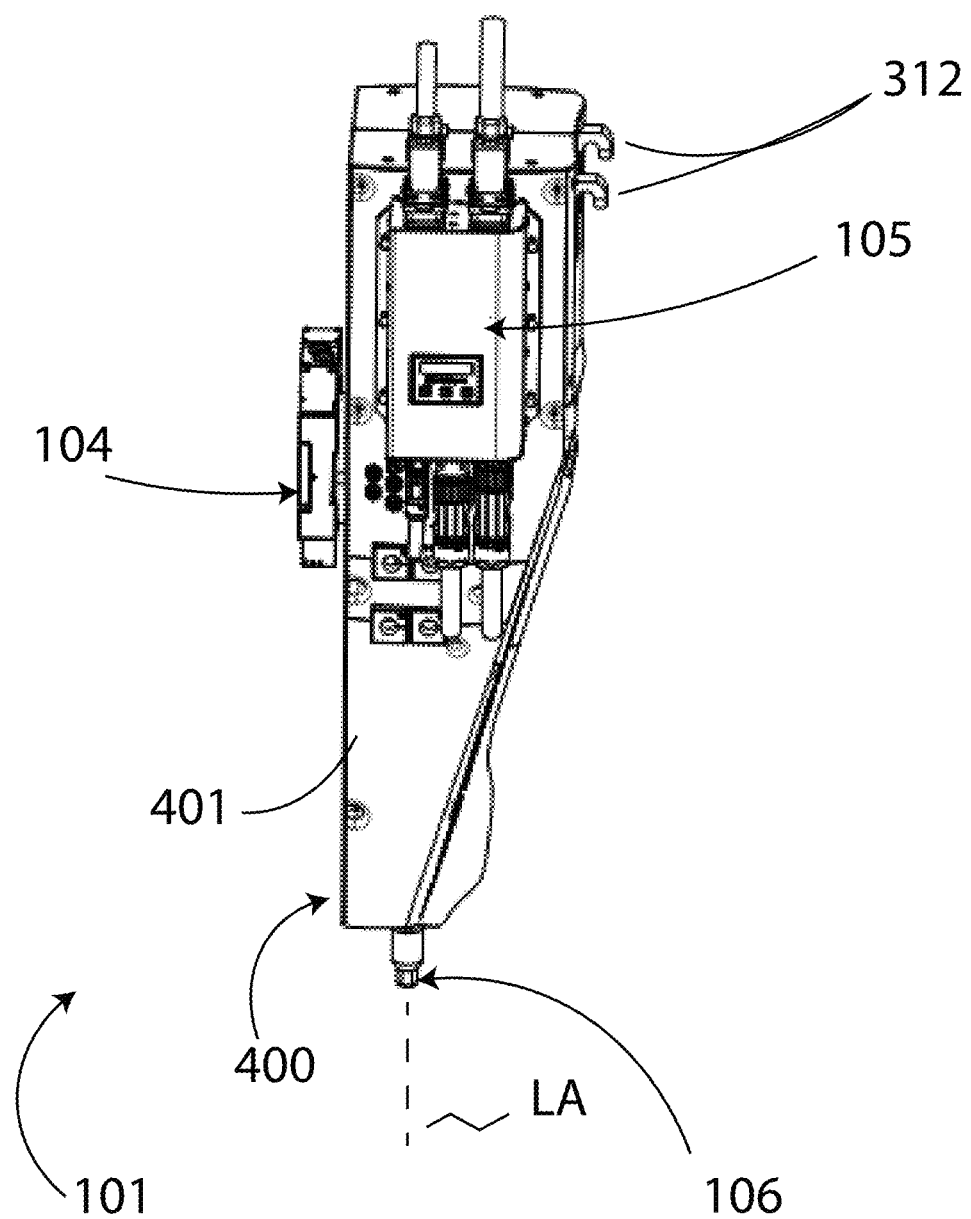
FIG. 11 is a perspective of an atmospheric plasma end effector of the atmospheric plasma system.
Figure 12:
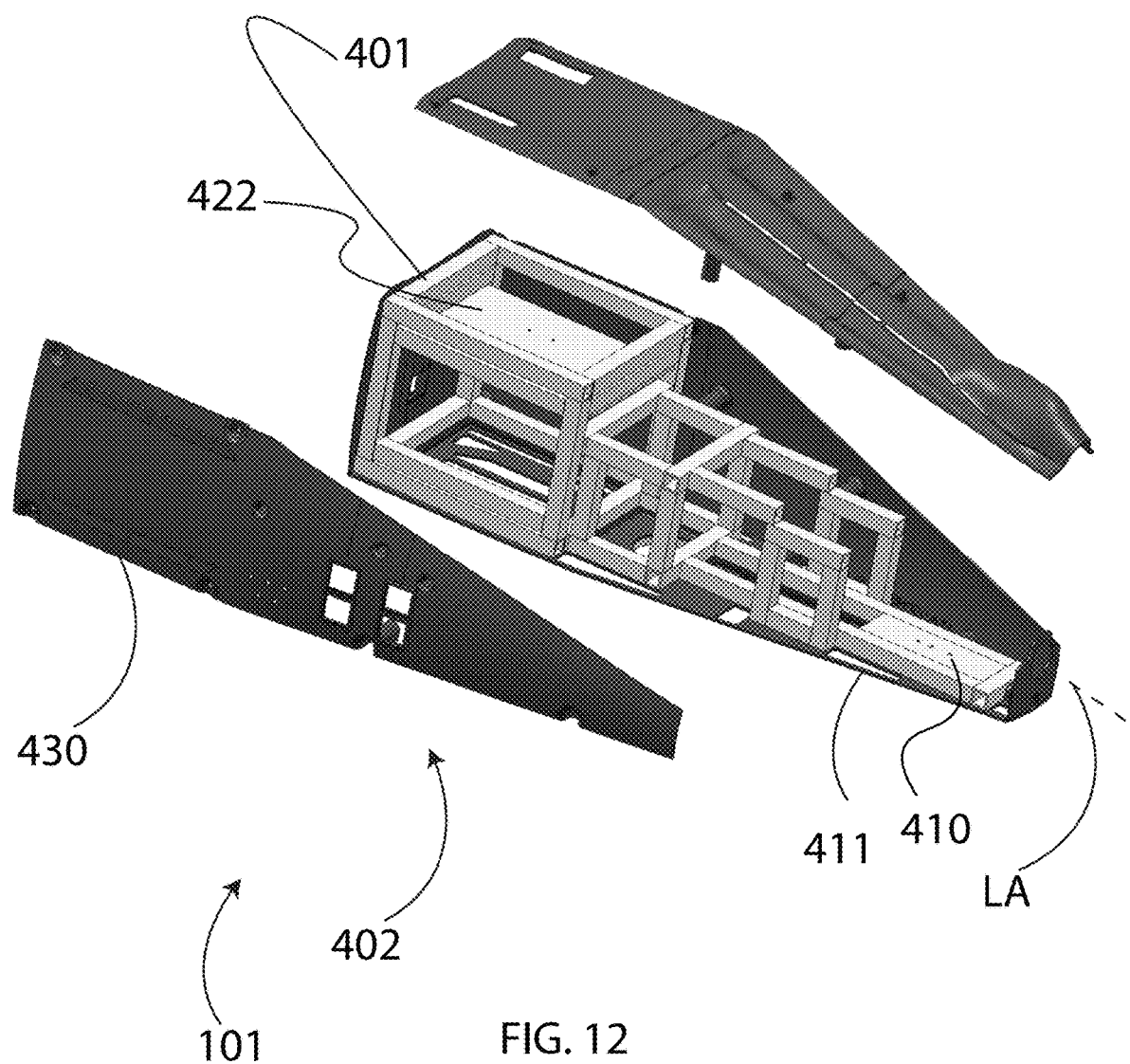
FIG. 12 is an exploded perspective of the atmospheric plasma end effector.
Figure 13:
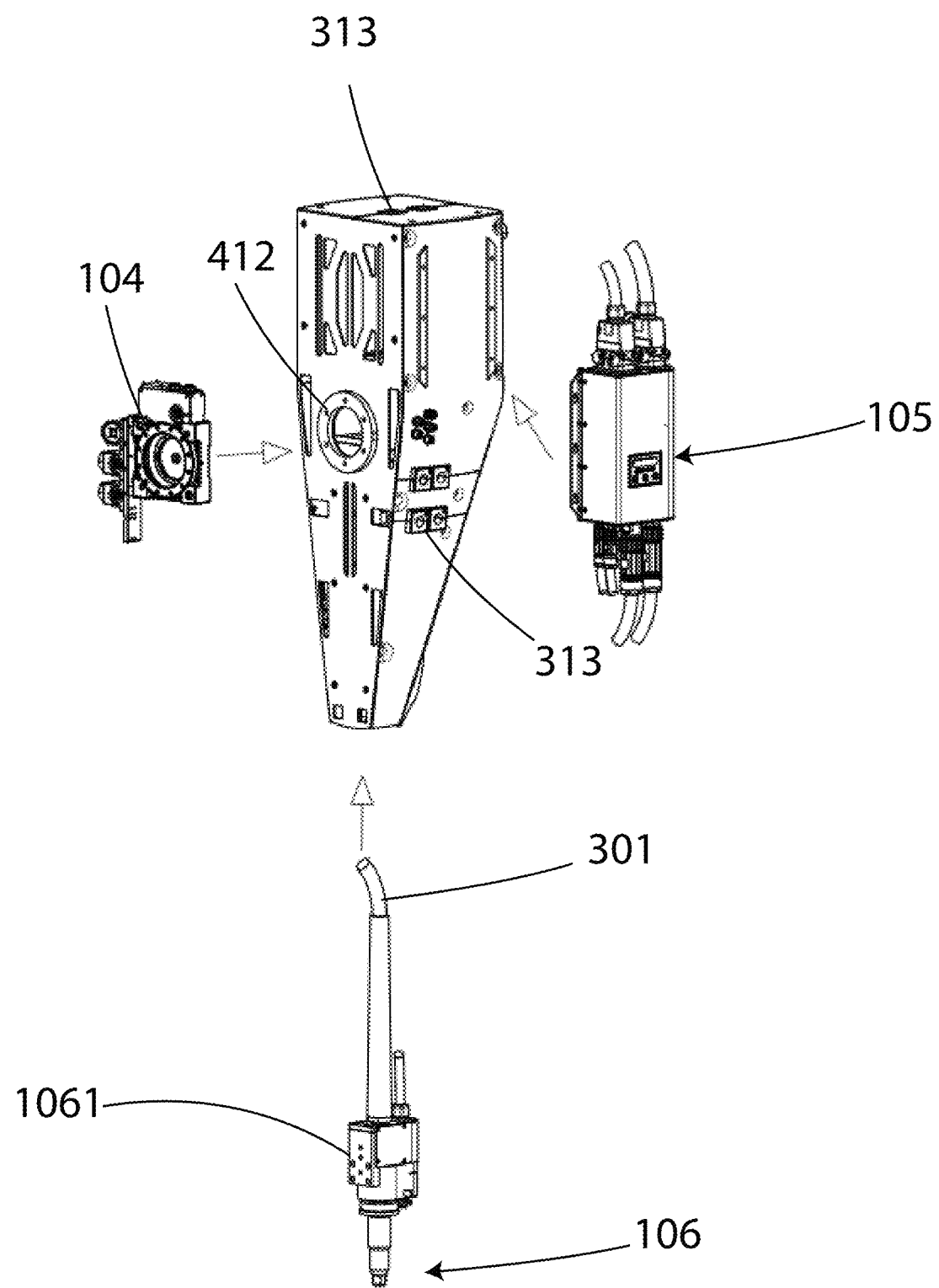
FIG. 13 is another exploded perspective of the atmospheric plasma end effector.

Referring to FIGS. 11-13, the atmospheric plasma end effector 101 comprises an end effector body 400 made up of an internal chassis 401 (broadly, a frame) and an external housing 402. The body 400 is configured to support the components of the end effector 101 on the end of the JARVIS robot 24. The illustrated end effector body 400 supports a slave tool changer 104, a plasma control unit (PCU) 105, a rotary plasma nozzle 106, and a docking hook 312. In one or more embodiments, the chassis 401 comprises a framework of support beams located inside the end effector housing 402. The end effector housing 402 comprises a set of body panels secured to the chassis 401 to substantially enclose the interior of the end effector body 400.

The end effector body 400 has a proximal end portion and a distal end portion spaced apart along a longitudinal axis LA. The chassis 401 comprises a nozzle mount 410 adjacent the distal end portion of the body 400. The nozzle mount 410 is broadly configured to mount the plasma nozzle 106 at the distal end portion of the body 400 so that the nozzle can direct a rotary beam of plasma out of the distal end portion of the end effector 101, generally distally along the longitudinal axis LA. In the illustrated embodiment, the nozzle mount 410 comprises a bolt plate with holes configured to align with threaded bolt holes on a mounting plate 1061 of the nozzle 106 so that threaded bolts can mount the nozzle on the end effector body 400 at the nozzle mount. In the illustrated embodiment, the nozzle 106 is mounted partially inside the housing 402. The tip of the nozzle 106 protrudes distally from the distal end of the end effector body 400.

The end effector body 400 has a robot interface side and an opposite docking side spaced apart along an axis perpendicular to the longitudinal axis LA. The robot interface side of the end effector body 400 comprises a tool changer mount 412 configured to mount the slave tool changer 104 on the end effector body. The opposite hanging side of the end effector body 400 comprises a hook mount 422 at which the docking hooks 312 mount on the body. The illustrated tool changer mount 412 comprises a circular mounting plate on the end effector housing 402. The mounting plate 412 defines a plurality of bolt holes through which mounting bolts (not shown) can attach the slave tool changer 104 to the end effector body 400.

The illustrated hook mount 422 comprises a mounting plate of the chassis 401. The mounting plate 422 also defines bolt holes through which mounting bolts (not shown) can attach the docking hooks 312 on the end effector body 400. Along the docking side of the end effector body 400, the housing 402 comprises slots through which the docking hooks protrude so that they are external to the housing. The docking hooks 312 are configured to hang the end effector 101 in a modular tool cartridge 110 of the JARVIS cell 10. The docking hooks 312 suspend the end effector 101 so that the slave tool changer 104 faces the doorway for to the MTC 110. This allows the robot 24 to access the slave tool changer 104 through the doorway to operatively connect to the end effector 101 in the MTC. When the robot 24 is finished using the plasma end effector 101, the robot 24 can move the end effector through the doorway, hang the end effector in the modular tool cartridge 110 by the docking hooks 312, and disconnecting from the slave tool changer 104.

In the illustrated embodiment, the end effector body 400 further comprises a plasma control unit mount 430 configured to mount the plasma control unit 105 on the outside of the end effector body. Positioning the plasma control unit 104 on the outside of the end effector body provides access to the controls on the plasma control unit for making adjustments. In addition, the location of the plasma control unit 104 on the outside of the end effector body 400 is suitable for cable routing. The illustrated plasma control unit mount 430 mounts the plasma control unit 140 on the side of the end effector body 400 between the tool changer 104 and the docking hooks 312. The plasma control unit mount 430 comprises bracketing defining bolt holes through which mounting bolts (not shown) are configured to mount the plasma control unit 105 on the side of the end effector body 400.

Figure 14:
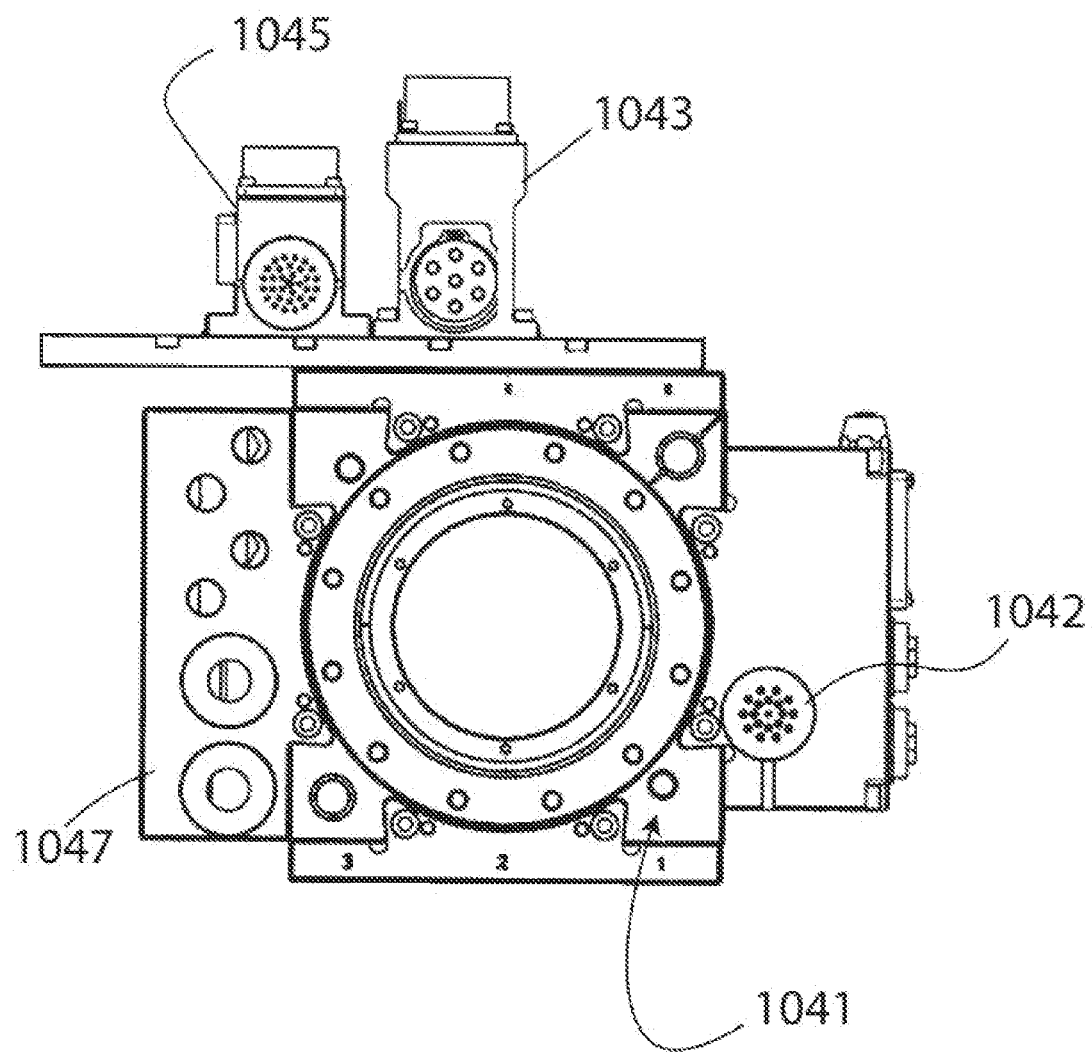
FIG. 14 is an elevation of a slave tool changer for the atmospheric plasma end effector.

Referring to FIG. 14, the slave tool changer 104 is complementary to the master tool changer 26 with connectors configured to operatively connect the end effector 101 to a subset of the connectors of the master tool changer. The illustrated slave tool changer 104 comprises a mounting interface 1041 configured for selectively mounting the end effector on the master tool changer 26. The mounting interface 1041 comprises a signal connector 1042 that couples to the mating signal connector 2614 on the master tool changer so that the master tool changer can determine (i) that it has been properly aligned with the slave tool changer for locking and (ii) that it has been connected to the atmospheric plasma generator, as opposed to another robotic tool. After the locking actuator 2612 of the master tool changer 26 locks the slave tool changer 104 to the master tool changer, the tool changers 26, 104 support the plasma end effector 101 on the end of the industrial robot 24 for performing atmospheric plasma surface treatment operations.

In the illustrated embodiment, the slave tool changer 104 comprises two special-purpose plasma generator connectors 1043, 1045 and a pneumatic connector 1047. The plasma generator connectors 1043, 1045 are configured to make electrical connections to the connectors 2626, 2628 of the master tool changer 26 so that the plasma generator 102 has power and signal connections to the end effector 101. The pneumatic connector 1047 connects the end effector 101 to the pneumatic connector 2624 of the master tool changer 26, whereby compressed air from the JARVIS cell is conveyed to the end effector 101.

Referring to FIGS. 10-13, the plasma control unit 105 is a digital controller generally configured to control and monitor the plasma nozzle. The plasma control unit 105 is electrically coupled to the plasma generator 102 (via tool changer connectors 1043, 1045, 2626, 2628) and comprises an integrated transformer (not shown) configured to transform the current from the generator 102 to a high voltage output for generating plasma. Compressed air from the JARVIS cell 10 and power and signals from the plasma generator 102 are conveyed to the plasma control unit 104 via cables and hoses that enter the more distal end of the plasma control unit. The power and signals cables extend from the connectors 2626, 2628 into the interior of the end effector body 400 to the plasma generator. In effect, the mating connectors 1043, 1045, 2626, 2628 of the tool changers 26, 104 provide a reconnectable splice point in the conventional atmospheric plasma cabling that extends from the conventional plasma generator to the conventional plasma control unit. This enables the end effector 101 (and plasma control unit 105) to disconnect from the plasma generator 102 when docked in the modular tool cartridge 110.

Output cabling extends from the more proximal end of the plasma control unit 105 and is routed through cable glands 313 in the proximal end of the end effector body 400 to the plasma nozzle 106. In the illustrated embodiment, the end effector body 400 is sized and arranged to accommodate the standard length cabling between the plasma control unit 105 and the plasma nozzle 106. The cabling (only partially shown) extends proximally from the plasma control unit 104, bends about 180° to extend distally through the proximal cable glands 313, and extends inside the end effector body 400 to the nozzle 106. The end effector body 400 tapers toward the distal end portion where less internal cable accommodation space is required than at the proximal end portion. Air, high voltage current, and control signals are passed through the output cabling between the control unit 105 to the plasma nozzle 106.

In one or more embodiments, the plasma control unit 105 can comprise various digital control modules (e.g., processor executable code stored in memory and configured to be executed by a processor of the plasma control unit) for controlling the plasma nozzle 106. For example, the plasma control unit 105 comprises a digital flow control module for controlling and monitoring process gas flow through the nozzle 106. The plasma control unit 105 can also comprise a digital pressure control module for controlling and monitoring process gas pressure at the nozzle 106. Still further, the plasma control unit 105 can comprise a rotation control module for controlling a rotary motor of the plasma nozzle 106 and monitoring rotation. The plasma control unit 105 can further comprise a plasma power measurement module for monitoring the output of the integrated transformer.

The plasma nozzle 106 is generally configured to direct a rotating beam of plasma from the distal end portion of the end effector body 400. The plasma nozzle 106 comprises an internal electrode (not shown) coupled to the high voltage output of the plasma control unit transformer. The high voltage applied to the internal electrode generates an electric discharge. Simultaneously, the plasma control unit 105 is configured to direct a controlled amount of pressurized air through the nozzle 106. The electric discharge interacts with the air to create a beam of plasma. The plasma nozzle 106 further comprises a motor (not shown) configured to rotate a portion of the nozzle while the plasma beam is being created so that the plasma beam rotates. The plasma imparted from the nozzle 106 can clean a composite part and increase a surface free energy of the composite part to improve adhesive bonding.

An exemplary method of using the JARVIS cell in an inspection and repair process that utilizes the atmospheric plasma end effector 101 will now be briefly described. After a composite part is loaded into the JARVIS cell 10 and any desired part identification processes are conducted, the JARVIS cell 10 uses its laser scanners to obtain a three-dimensional (3D) model of the part. The JARVIS software framework then maps 3D model to robot positioning coordinates for the JARVIS robot so that subsequent robot actions are coordinated in relation to the location of the part inside the cell 10.

After the 3D model is obtained and mapped to the robot coordinate system, non-destructive testing (NDT) is conducted. During inspection, NDT techniques such as laser shearography, pulsed thermography, ultrasonic imaging, etc., are used to obtain NDT images of the part. For each NDT technique applied, the robot 24 can use the master tool changer 26 to couple to the corresponding end effector in a modular tool cartridge 110, and then the JARVIS control system 1160 can control the robot and the end effector to take the NDT images. After each NDT process is complete, the robot 24 automatically docks the NDT end effector in its modular tool cartridge 110 and disconnects from the end effector at the master tool changer 26.

Based on the NDT images (which may be stitched together to form a composite image as described in U.S. patent application Ser. No. 17/828,558), the JARVIS software or a human inspector identifies any damage to the composite part. The JARVIS software then maps a bounding box for each damage area to robot positioning coordinates to create repair section coordinates from which scarfing and surface preparation tool paths can be generated.

After determining the repair section coordinates, the JARVIS cell is configured to automatically perform at least certain steps of a repair process. As explained in U.S. patent application Ser. No. 17/828,558, the JARVIS cell 10 is configured to automatically perform both skin scarf patch repairs and core splice repairs. This disclosure focuses on skin scarf patch repairs, and particularly the role of the atmospheric plasma generator in making a skin scarf repair.

Initially, the JARVIS software framework operates the robot 24 to connect (via master tool changer 26) to a milling end effector (not shown). Then, based on the repair section coordinates determined above, the JARVIS software framework controls the robot 24 and the milling end effector to remove a predefined geometry of skin material from the composite part near the damaged area.

After the skin material has been removed from the scarf area, the JARVIS cell can prepare the surface of the scarf area for adhesive bonding. Initially, the JARVIS cell 10 directs the robot to dock the milling end effector in the corresponding modular tool cartridge. Then the JARVIS cell directs the robot 24 to couple to the atmospheric plasma end effector 101. The robot 24 aligns the master tool changer with the slave tool changer 104 and brings the tool changers together until the connectors 2614, 1042 are mated together. This signals the master tool changer 26 that it is operatively aligned with the atmospheric plasma end effector 101. In response, the master tool changer 26 actuates the locking actuator 2612 to lock the slave tool changer 104 to the master tool changer.

Once the atmospheric plasma end effector 101 is operatively connected to the robot 24, the JARVIS cell 10 can conduct surface preparation operations. Referencing the repair section coordinates, the JARVIS cell software framework generates a tool path that directs the robot 24 to move the atmospheric plasma end effector 101 to the repair area where patch material will be adhered. The tool path defines the nozzle movement speed, nozzle working height (distance between nozzle and surface being treated), and number of passes, based on material-specific treatment parameters that can be determined experimentally prior to any cell processes being conducted. The robot 24 moves the atmospheric plasma end effector 101 along the defined tool path while the atmospheric plasma system 100 operates the plasma generator 102 and plasma control unit 105 to direct a rotating beam of atmospheric plasma from the nozzle. Due to the simplicity of the software control portion of the equipment, the atmospheric plasma system 100 can be controlled by predefined setting recipes that are pre-programmed into the JARVIS controller. The JARVIS software framework simply controls plasma generation output using a logic controller switch to turn on and off the plasma generation.

After surface treatment is complete, a test can be conducted to determine bond readiness. The bond readiness test can be conducted in non-automated fashion using a laboratory surface analyst system such as the BTG Labs Surface Analyst XA system. Alternatively, the JARVIS cell 10 can be configured to automatically conduct a bond readiness test using a surface analyst end effector of the type described in U.S. Provisional Patent Application No. 63/271,541, which is hereby incorporated by reference in its entirety. In this case, the JARVIS cell docks the atmospheric plasma end effector 101 in its modular tool cartridge 110, then connects to the surface analyst end effector, and conducts an automatic bond readiness test of the treated surfaces to determine readiness for bonding. If the bond readiness test indicates the treated surface is not ready for adhesive bonding, the JARVIS cell can repeat the atmospheric plasma surface treatment until bond readiness testing indicates the desired surface characteristics are achieved.

After the surface is treated and bond readiness is established by testing, a scarf repair patch can be applied to the treated area. The patch can be machined and the adhesive can be applied using the principles described in U.S. patent application Ser. No. 17/828,558.

For some multilayer scarf repairs, after a first patch is adhered to the repair area, before a subsequent patch is applied, the JARVIS cell 10 can optionally repeat the surface treatment and bond readiness test sub-processes for each subsequent patch.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A robot end effector for surface preparation in an automated inspection and repair system for composite parts, the robot end effector comprising:
    an end effector body;
    a plasma control unit and a plasma jet nozzle supported on the end effector body, the plasma control unit configured for directing a jet of atmospheric plasma through the plasma jet nozzle; and
    a slave tool changer secured to the end effector body, the slave tool changer configured to releasably and operatively connect the robot end effector to an industrial robot such that the industrial robot is configured to move the robot end effector along a composite part as the plasma control unit directs a jet of atmospheric plasma through the plasma jet nozzle toward the composite part to clean the composite part and increase a surface free energy of the composite part;
    wherein the slave tool changer is configured to connect the plasma control unit to a plasma generator remote from the robot end effector;
    wherein the slave tool changer comprises a plasma coupling configured to operatively connect the robot end effector to a plasma coupling of a master tool changer on the industrial robot;
    the robot end effector further comprising a first plasma line extending from the plasma coupling to the plasma control unit and second plasma line extending from the plasma control unit to the plasma jet nozzle.

2. The robot end effector of claim 1, further comprising a docking hook secured to the end effector body for suspending the robot end effector in a ready position when disconnected from the industrial robot.

3. The robot end effector of claim 2, wherein the end effector body has a proximal end portion and a distal end portion spaced apart along a longitudinal axis, wherein the plasma jet nozzle is located adjacent the distal end portion and the docking hook is located adjacent the proximal end portion.

4. The robot end effector of claim 2, wherein the docking hook and the tool changer are on opposite sides of the end effector body.

5. A method of repairing a composite part, the method comprising:
    connecting an industrial robot to an inspection end effector and inspecting the composite part;
    subsequently disconnecting the inspection end effector from the industrial robot and connecting the robot end effector of claim 1 to the industrial robot via the slave tool changer;
    subsequently using the robot end effector of claim 1 to treat a surface the composite part; and
    subsequently adhering a repair patch to the treated surface.

6. The method of claim 5, further comprising, before inspecting the composite part, scanning the composite part to obtain a three dimensional model of the composite part.

7. The method of claim 6, further comprising, mapping the three dimensional model to robot positioning coordinates to coordinate movement of the robot to the composite part.

8. The method of claim 7, further comprising, after inspecting the composite part and before treating the composite part, determining based on said inspecting, a damage location on the composite part.

9. The method of claim 8, further comprising, after determining the damage location of the composite part, determining a scarf path in terms of the robot positioning coordinates and operating the industrial robot along the scarf path to scarf damage from the damage location.

10. The method of claim 9, further comprising, wherein said using the robot end effector of claim 1 to treat the surface of the composite part comprises determining a treatment path in terms of the robot positioning coordinates and operating the industrial robot to along the determined treatment path to treat a scarfed area of the composite part with atmospheric plasma.

11. The method of claim 9, wherein said connecting the industrial robot to the inspection end effector comprises removing the inspection end effector from a first modular tool cartridge of an autonomous inspection and repair cell, said disconnecting the inspection end effector comprises placing the inspection end effector in the first modular tool cartridge, and said connecting the robot end effector of claim 1 to the industrial robot comprises removing the robot end effector from a second modular tool cartridge of the autonomous inspection and repair cell.

12. An industrial robot system comprising:
    an industrial robot;
    the robot end effector of claim 1; and
    a control system configured to control both the industrial robot and the end effector to coordinate movement of the industrial robot and the plasma control unit to treat a predefined surface region of the composite part with atmospheric plasma to increase a surface free energy of the predefined region surface region.

13. The industrial robot system as set forth in claim 12, further comprising another robot end effector for performing a composite part inspection and repair process selected from a list of composite part inspection and repair processes consisting of: non-destructive testing, scarfing, and patch making.

14. The industrial robot system as set forth in claim 13, wherein the industrial robot comprises a master tool changer configured to interchangeably connect to the robot end effector of claim 1 and said another robot end effector and wherein the control system is further configured to control the industrial robot and said another end effector to coordinate movement of the industrial robot with use of said another robot end effector for performing said composite part inspection and repair task on the composite part.

* * * * *